Figure 1:
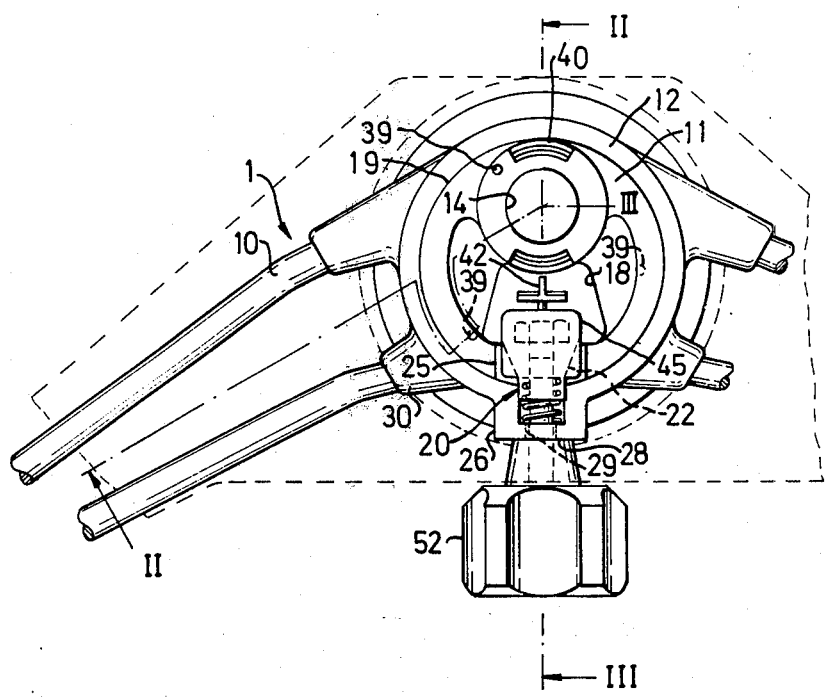

United States Patent [19]

Sjöqvist

[11] 4,299,138
[45] Nov. 10, 1981

[54] STEERING WHEEL FOR VEHICLES

[75] Inventor: Carl D. I. Sjöqvist, Järna, Sweden

[73] Assignee: Saab-Scania Aktiebolag, Sodertalje, Sweden

[21] Appl. No.: 92,023

[22] Filed: Nov. 7, 1979

[30] Foreign Application Priority Data

Nov. 10, 1978 [SE] Sweden .............................. 7811616

[51] Int. Cl.³ ............................................. B62D 1/10
[52] U.S. Cl. ........................................ 74/552; 74/548; 403/104
[58] Field of Search ................ 74/552, 554, 493, 492, 74/548; 403/104, 108, 328; 280/775

[56] References Cited

U.S. PATENT DOCUMENTS

| 1,703,485 | 3/1927 | Hughes | 74/493 |
| 3,276,287 | 7/1963 | Albrecht | 74/493 |
| 3,548,128 | 12/1970 | Willett | 74/493 |

FOREIGN PATENT DOCUMENTS

| 2848707 | 10/1979 | Fed. Rep. of Germany | 74/493 |
| 490959 | 8/1938 | United Kingdom | 74/493 |

Primary Examiner—Kenneth Dorner
Attorney, Agent, or Firm—Cushman, Darby & Cushman

[57] ABSTRACT

A steering wheel for vehicles, comprising a steering wheel rim to which is firmly connected a steering wheel hub which is arranged for attaching the steering wheel to the upper portion of a steering shaft installed in a vehicle, the steering wheel hub mainly comprising a spoke hub and an inner hub which are concentric and engage with each other, being mutually displaceable in an axial direction. The spoke hub is firmly connected to the steering wheel rim, and the inner hub is intended to be rigidly mounted on the steering shaft. The spoke hub and the inner hub are connected to each other via a locking means which locks the respective hubs radially and allows mutual axial adjustment of the hubs, whereby the steering wheel can be caused to assume alternative positions in height relative to the steering shaft.

8 Claims, 3 Drawing Figures

STEERING WHEEL FOR VEHICLES

STEERING WHEEL FOR VEHICLES

The present invention relates to a steering wheel for vehicles, comprising a steering wheel rim with a steering wheel hub firmly connected thereto and arranged for mounting the steering wheel to the upper portion of a steering shaft installed in a vehicle.

In motor engineering, demands for increased comfort and improved ergonometric conditions for vehicle drivers have been accentuated in recent times. By making it possible for drivers of vehicles to assume comfortable driving postures, the risk of fatigue is reduced which in turn results in that traffic safety is improved.

Considering that drivers have different bodily constitutions, it is necessary for the driving position in a vehicle to be adjustable so that every driver can assume his own suitable driving posture. In respect to this consideration it is known to provide adjustability of the driving position by arranging the driver's seat adjustable in different positions. Driver's seats and their adjusting mechanisms are generally dimensioned after a statistically normally built person, but in reality there are very few people conforming to this ideal person.

To increase the adjustability of the driving position in a vehicle, it is also known to provide adjustment of the steering wheel height and/or inclination. Devices for accomplishing this, known up to now, are however complicated, and this has resulted in the limited application of such adjusting means in vehicles, and then usually at comparatively high cost.

The height adjustability of the steering wheel in known adjusting means is usually provided by forming the steering shaft with at least two coacting parts which are non-rotatably connected and axially displaceable relative to each other. Locking the steering shaft in an axial position is done in this case by means of a keyed joint, which is placed between the two displaceable steering shaft portions, or by means of some form of positive lock.

Telescopic steering shafts require, however, that they are manufactured with very severe demands on tolerances so that clearances and play will not be too large. Also, there are great demands on the mounting means of the telescopic parts. These manufacturing demands result in that a means for height adjustment of a steering wheel using axial adjustment of a telescopic steering shaft becomes both complicated and expensive to manufacture.

The present invention has the object of enabling fitting and height adjustment of a steering wheel to a steering shaft fitted to a vehicle, using a simple and cheap structure, the invention being substantially distinguished in that the steering wheel hub comprises at least two concentric hub parts with one hub part slidably mounted in another hub part, and that said hub parts comprise a spoke hub firmly attached to the steering wheel rim via a plurality of spokes, and an inner hub intended for being rigidly mounted to the steering shaft, said hub parts being connected to each other via a locking means positionally fixing said hub parts radially and allowing adjustment of said hub parts in different axial positions relative to each other.

The steering wheel in accordance with the present invention allows rapid height adjustment of a steering wheel position, and the adjustment mechanism is so formed that steering ability and operational safety are not affected by the varying positions in height of the steering wheel.

Other characterizing features of the invention are apparent from the appended patent claims and can also be read from the description below of an embodiment exemplifying the invention. The description is made with reference to the attached drawings, on which FIG. 1 is a partial plan view of an inventive steering wheel, FIG. 2 is an axial section along the line II—II in FIG. 1 of the steering wheel fitted to a steering shaft, and FIG. 3 shows in the same way an axial section along the line III—III in FIG. 1.

Figure 2:
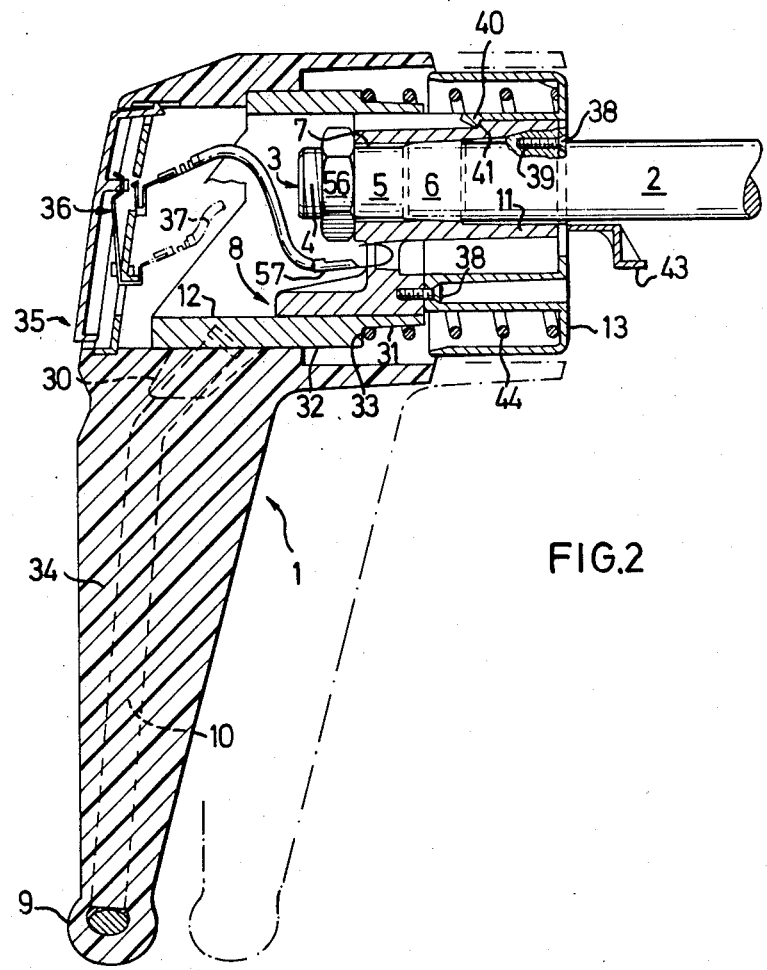
Figure 3:
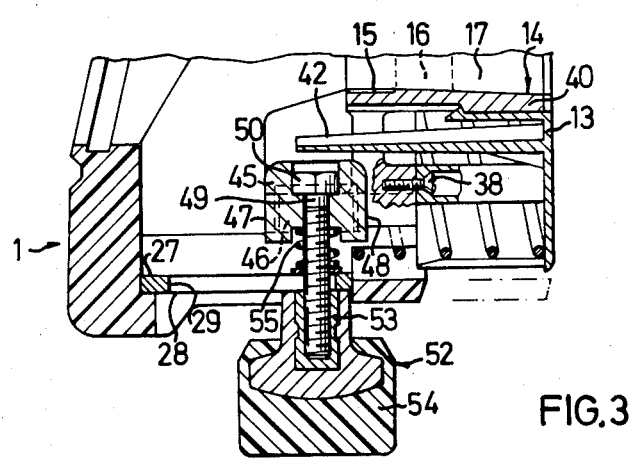

FIGS. 2 and 3 illustrate how a steering wheel 1, intended for steering a vehicle, is fitted to a steering shaft 2. The latter is conventionally, rotatably mounted in mounting means (not shown) attached by brackets or the like to structural portions of the vehicle, e.g. cowling and/or instrument panel. At its lower end, the steering shaft 2 is conventionally connected to a steering gear (not shown) and/or other means included in the vehicle steering system.

The steering shaft 2 is a solid steel shaft of substantially cylindrical shape, and at its upper end it is formed with three shouldered shaft portions 4,5,6 having diameters decreasing successively towards the upper end 3 of the steering shaft. The innermost shaft portion 6 tapers towards the outmost end 3 of the steering shaft, the intermediate shaft portion 5 has splines 7, and the outmost shaft portion 4 is threaded.

The steering wheel 1 is removably attached to the upper portion of the steering shaft 2, and mainly comprises a steering wheel hub 8 with a steering wheel rim 9, these two being rigidly attached to each other by means of a plurality of spokes 10. In its turn, the steering wheel hub 8 comprises three concentric hub parts, an inner hub 11, a spoke hub 12 and a bottom cap 13. The inner hub 11 is formed to advantage from aluminium and has a cylindrical outer shape. The inner hub 11 is axially formed with an eccentric throughhole 14, the inner surface of which is formed for coaction with the shaft portions 4,5,6 on the upper part of the steering shaft 2. The through-hole 14 is thus formed with a tapering portion 16 for coaction with the conical shaft portion 6 on the steering shaft 2, a portion with splines 15 for coaction with the splines 7 on the steering shaft 2, while the remaining portion 17 of the through-hole 14 is cylindrical and is a free fit on the cylindrical portion of the steering shaft 2.

When mounting the steering wheel 1 on the steering shaft 2, the conical surface 16 of the inner hub 11 is seated against the conical surface 6 of the steering shaft 2, and the splines 7, 15 of the inner hub 11 and the steering shaft 2, respectively, are caused to mesh with each other. The inner hub 11 is then locked axially and radially by a lock nut 56 screwed onto the outer portion 4 of the steering shaft 2.

A recess 18 is made in the inner hub 11, parallel to the axis of the through-hole 14. An axially extending slot 20 is formed between the recess 18 and the circumference 19 of the inner hub 11. In an axially middle portion the respective sides 22 of the slot 20 are mutually tapering such that the greatest distance between them is nearest the mouth of the recess 18, while the respective sides 25 of the slot 20 located in an upper and in a lower longitudinal portion of the inner hub 11 are parallel and have a width between them greater than said greatest distance at the wedged middle portion.

The spoke hub 12 is slideably mounted on the inner hub 11, described above. The upper portion of the spoke hub 12 is provided with four sleeve-like attachments 30 into which are pressed the inner ends of the spokes 10. For the major portion of its length, the spoke hub 12 is formed as a cylindrical tube having a radially projecting and axially extending projection 26. The latter is formed with an outer plane surface 28, parallel to the central axis of the spoke hub 12. On its inside, the projection 26 is formed with an elongate inner cavity with a flat bottom 27, parallel to the surface 28 of the projection 26. Between said surfaces 27, 28 there is an elongate slot 29 having a limited axial extension.

The lower portion 31 of the spoke hub 12 has a smaller diameter than the upper portion 32 of the spoke hub 12, and the junction between said portions is formed as a shoulder. As will be seen from the description later, the surface 33 of the shoulder thus formed constitutes a spring seating when the steering wheel 1 is fitted to the steering shaft 2.

The steering wheel 1 is conventionally provided with an outer covering 34 of a plastics material, moulded to enclose the spoke hub 12, spokes 10 and steering wheel rim 9. In the central portion of the steering wheel 1, the outer covering 34 is formed with a recess 35, in the upper portion of which a switch 36 is fitted for the vehicle horn, and is fitted by a snap lock. The switch 36 is intended to function in a known way when pressed axially. For this reason, the switch 36 is connected to a signal horn (not shown) via a wire 37, and via another wire it is connected to the vehicle earth or ground, which in the example described here is illustrated by a connection 57 to the inner hub 11.

The bottom cap 13 is concentrically fitted to the lower portion of the inner hub 11, and is formed with two axial spring tongues 40, disposed for snapping onto corresponding abutments 41 when the bottom cap 13 is fitted to the inner hub 11. The attachment proper of the bottom cap 13 is made with a plurality of screws 38, engaging in axial, threaded holes 39 in the inner hub 11. A compression spring 44 is compressed between the inside of the bottom cap 13 and the shoulder surface 33 of the spoke hub 12, to actuate the spoke hub 12 upwardly relative to the inner hub 11 and the bottom cap 13.

A cranked arm 43 projects out from the lower portion of the bottom cap 13, said arm being intended for actuating conventional means resetting the direction indicators (not shown) of the vehicle to a neutral position after use. The bottom cap 13 is also provided with an axial supporting pillar 42 which runs through the axial recess 18 in the inner hub 11 when the bottom cap 13 is fitted to the inner hub 11. A wedge 45 is fitted in said recess 18. The former is formed with two rectangular flank portions 47, 48 with a wedge shaped portion 46 between them, which is arranged to fit in the intermediate portion of the axial slot 20 on the inner hub 11, while the respective flank portion 47, 48 of the wedge fits the respective end portion of the axial slot 20, and as previously mentioned, these end portions are formed with parallel sides 25 on either side of the intermediate portion formed with sloping sides. By such configuration, the wedge 45 will be axially secured when fitted into the axial slot 20 on the inner hub 11.

In the intermediate portion 46, the wedge 45 is provided with a transverse hole for a bolt 49. A countersunk portion of the hole is formed to the same configuration as the head 50 of the bolt to lock the latter against rotation. The shank of the bolt 49 goes through the axial slot 29 in the projection 26 of the spoke hub 12, and at its free end it is provided with a threaded on locking knob 52. The latter comprises a threaded insert 53 and an outer covering 54 of a plastics material. When the knob 52 is tightened down onto the outer, flat surface 28 on either side of the axial slot 29 of the spoke hub 12, the intermediate portion 46 of the wedge 45 will be pressed into the intermediate portion 22 of the axial slot 20 in the inner hub 11, the spoke hub 12 thereby being clamped rigidly in an axial position relative to the inner hub 11. This results in that the diameter of at least the outer portion of the inner hub 11 increases somewhat, thereby causing the inner hub 11 to be clamped against the interior mantle surface of the spoke hub 12. Furthermore, the locking knob 52 acts as a clamping means per se, since it forces the spoke hub 12 inwards, towards the inner hub 11.

The clamping connection between the spoke hub 12 and the inner hub 11 described above signifies that the steering wheel rim 9 and the spoke hub 12 firmly attached to it are mounted infinitely axially displaceable on the inner hub 11. Furthermore, the shank of the bolt 49 passing through the axial slot 20 in the inner hub 11 and the axial slot 29 in the spoke hub 12 result in that the two hubs 11, 12 are non-rotatably attached to each other, even if the locking knob 52 is not tightened down.

In the inventive height adjusting mechanism, the inner hub 11 and the removably mounted wedge 45 are consequently positionally fixed relative to the steering shaft 2, whereas the steering wheel rim 9 and the spoke hub 12 firmly connected thereto are displaceable to different axial positions. For a desired alteration in the axial position of the steering wheel rim 9, the locking knob 52 is first undone, whereon the spoke hub 12 will be freely movable axially relative to the inner hub 11. The shank of the bolt 49 runs freely in the axial slot 29 in the spoke hub 12, and the spring 44 in the bottom cap 13 strives to push the spoke hub 12 upwards, it thus being necessary to push in the steering wheel rim 9 to the desired level before tightening the locking knob 52.

In FIGS. 2 and 3, the steering wheel 1 is illustrated adjusted to an upper position relative to the steering shaft 2, its lower position being indicated by dash-dotted lines.

A compression spring 55 is fitted between the wedge 45 and the flat slot bottom surface 27 of the spoke hub 12, and said spring strives to press the wedge 45 out of the axial slot 20 in the inner hub 11. When the locking knob 52 is untightened completely, the wedge 45 is however prevented from being pushed too far out of the slot 20 by means of an axial bearing column 42 on the bottom cap 13 which is accommodated in the recess 18. This also results in that the torque transmission between the spoke hub 12 and the inner hub 11 cannot be disengaged during use or during an adjustment operation.

The inventive steering wheel hub 8 allows, as previously mentioned, infinitely variable axial adjustment of the steering wheel rim 9, which is more advantageous than if adjustability were limited to certain given positions. In addition, the invention has many practical advantages. By adjustability being built into the steering wheel hub 8 itself, it is possible to use the same steering shaft 2 with vehicles which may or may not be equipped with a height-adjustable steering wheel hub. It is thus possible to equip already existing vehicles not having a height-adjustable steering wheel, with an inventive adjustable steering wheel hub 8. It is also possible to combine the inventive steering wheel hub 8 with means for adjusting the sloping attitude of a steering wheel 1. It is furthermore simple to adapt the inventive steering wheel hub 8 to a so-called impact-absorbing steering column, used to prevent injury to the driver by the steering wheel in a collision.

The inventive steering wheel hub can be modified into alternative embodiments within the scope of the following patent claims, and is therefore not limited solely to the described embodiment. Accordingly, the inner hub 11 can be alternatively formed as a hub embracing the spoke hub 12, and the locking means can be formed with stepwise regulation of the axial height of the steering wheel rim relative to the steering shaft.

What I claim is:

1. A steering wheel assembly for a vehicle comprising a steering wheel rim and a steering wheel hub, said steering wheel hub comprising two telescopically connected, concentric hub parts, of which an outer hub part is firmly attached to the steering wheel rim via a plurality of spokes, and of which an inner hub part is adapted to be rigidly mounted to a steering shaft in the vehicle, said outer hub part being connected to said inner hub part via a locking means comprising a transverse wedge, said wedge in a locking position engaging an axial slot in said inner hub part and expanding said inner hub part so that said outer hub part will be fixed to said inner hub part, said wedge in a non-locking position allowing axial adjustment of said outer hub part relative to said inner hub part.

2. A steering wheel assembly as claimed in claim 1, wherein said inner hub part is formed with an axial through-hole with portions forming shoulders, coacting with complementary portions on the upper end of said steering shaft when said inner hub part is fitted to said steering shaft, thereby to fix said inner hub part both radially and axially relative to said steering shaft.

3. A steering wheel assembly as claimed in claim 2, wherein said inner hub part is formed with a recess parallel to said through-hole, said axial slot being formed between said recess and an outer circumferential surface of said inner hub part.

4. A steering wheel assembly as claimed in claim 3, wherein said axial slot in an axially central portion is formed with edge sides sloping toward each other, with the smallest mutual distance at said outer circumferential surface of said inner hub part; said slot in an axially upper and in an axially lower portion, respectively, being formed with parallel edge sides, the distance between which being greater than that between said sloping edge sides.

5. A steering wheel assembly as claimed in claim 4, wherein said outer hub part on its outer circumferential surface has an axially extending projection, said projection having on the inside of said outer hub part an open slot having a flat bottom, and on the outside a flat surface, there being an axial through guiding slot of limited extension between said surfaces.

6. A steering wheel assembly as claimed in claim 5, wherein said transverse wedge is arranged for engaging in said central portion of said axial slot on said inner hub part and in said inner open slot of said outer hub part, a bolt non-rotatably fitted in said wedge passing through said guiding slot and on the outside thereof being provided with a locking knob which, when being tightened down, acts against said flat surface of said projection.

7. A steering wheel assembly as claimed in claim 2, wherein a bottom cap is attached to a lower end of said inner hub part, a compression spring being fitted between an inside of said bottom cap and a shoulder surface formed on a lower portion of said outer hub part.

8. A steering wheel assembly as claimed in claim 7, wherein said bottom cap is formed with a supporting pillar axially extending into said recess of said inner hub part for limiting the transverse free movement of said wedge when clamping action against said sloping edge sides in said axial slot of said inner hub part is released.

* * * * *